United States Patent [19]

Fjeldsted

[11] 4,453,800

[45] Jun. 12, 1984

[54] SELECTABLE FIELD-OF-VIEW INFRARED LENS

[75] Inventor: Thomas P. Fjeldsted, West Covina, Calif.

[73] Assignee: Rockwell International Corporation, El Segundo, Calif.

[21] Appl. No.: 293,763

[22] Filed: Aug. 17, 1981

[51] Int. Cl.³ .............................................. G02B 13/14
[52] U.S. Cl. ..................................... 350/1.4; 350/453
[58] Field of Search ................... 350/1.3, 1.4, 442, 453

[56] References Cited

U.S. PATENT DOCUMENTS 3,296,443  1/1967  Argyle ................................ 350/1.3
4,030,805  6/1977  Rogers ............................... 350/1.4

Primary Examiner—Bruce Y. Arnold
Assistant Examiner—William Propp
Attorney, Agent, or Firm—H. Fredrick Hamann; Daniel R. McGlynn; James F. Kirk

[57] ABSTRACT

An infrared lens system for projecting an image from object space onto a flat image plane, the lens system being corrected over the spectral region of 3.3 to 4.2 microns and having a selectable narrow field of view comprising: an objective lens system having a plurality of lens elements formed of material optically transparent over the spectral region of 3.3 to 4.2 microns, the plurality of lens elements being coaxially aligned and adapted to receive light from object space and to form an image on the flat image plane, a selectable afocal telescope, the selectable afocal telescope being in select field of view determining relation with the objective lens system, whereby upon selection, the selectable afocal telescope cooperates with the objective lens system to provide a narrow field of view.

6 Claims, 1 Drawing Figure

SELECTABLE FIELD-OF-VIEW INFRARED LENS

BACKGROUND OF THE INVENTION

1. Field of the Invention

This invention relates to objective lens systems having multiple lenses of crystalline semiconductor materials such as silicon and germanium. The invention lens is particularly adapted for use in light weight portable FLIR (Forward Looking Infrared) surveillance systems.

2. Description of the Prior Art

Four element infrared objective lens systems having axially aligned optical elements of silicon and germanium are known and described in U.S. Pat. No. 3,321,264 to H. K. Sijgers et al., issued May 23, 1967. Lens systems of this type find particular application in scanning infrared systems. These systems typically employ a detector upon which an image is focussed by the invention lens system. The detector used is typically flat. Prior art lens designs are best suited for projecting an image on a curved field of curvature. The present three element infrared objective is designed to form a flat field of curvature.

Infrared objective lens systems used to project an image through a cold stop on to a flat detector forming an image plane in a cryogenically cooled space have the problem of re-imaging the detector onto itself. The mirror image of itself is due to reflections from the surfaces of lenses within the objective lens system. The image of the detector when sensed by the detector along with the intended image results in a loss of resolution. Re-imaging of the detector onto the detector by the infrared lens is an effect referred to as narcissus. The invention three element infrared objective lens is designed to effectively minimize the effect of narcissus while maintaining a flat field of curvature.

SUMMARY OF THE INVENTION

It is a major objective of this invention to produce a three-element infrared objective lens having an f/1.5 speed, corrected over the spectral region of 3.3 to 4.2 microns. The lens is equipped with a selectable reflective afocal telescope. Operating alone the lens provides a wide field of view. By selecting the reflective afocal telescope, the operator obtains a narrow field of view.

A particular objective of this invention is to obtain a selectable narrow field of view using a minimum number of telescope lens elements and without added inversion of the image appearing on the image plane upon selection of the telescope.

Another particular objective of this invention is to reduce the field curvature produced by projecting an image onto a flat detector.

Another even more particular objective of this invention is to minimize the effect of narcissus.

These and other objectives of the invention are realized in an infrared lens system for projecting an image from object space onto a flat image plane, the lens system being corrected over the spectral region of 3.3 to 4.2 microns and having a selectable narrow field of view.

The invention infrared lens system comprises an objective lens system having a plurality of lens elements formed of material optically transparent over the spectral region of 3.3 to 4.2 microns, the plurality of lens elements being coaxially aligned and adapted to receive light from object space and to form an image on a flat image plane.

The invention infrared lens system also comprises a selectable afocal telescope, the selectable afocal telescope being in select field of view determining relation with the objective lens system, whereby upon selection the selectable afocal telescope cooperates with the objective lens system to provide a narrow field of view.

In a first embodiment of the infrared lens system, the selectable afocal telescope further comprises a positive reflector, the positive reflector having a first reflector surface, an aperture, and a negative radius of curvature.

The selectable afocal telescope also includes a negative reflector, the negative reflector having a second reflective surface and a negative radius of curvature. The positive reflector is interposed between the negative reflector and the objective lens system, the positive reflector and negative reflector being coaxially aligned, spaced and coupled to the objective lens system.

As the afocal telescope is selected, the positive reflector is adapted to receive collimated light from object space, reflecting the collimated light to the negative reflector. The negative reflector reflects this light in collimated rays through the aperture to the objective lens system, forming a non-inverted and non-reverted image on the flat image plane, the afocal telescope thereby cooperating with the objective lens system to provide a narrow field of view.

In a particular embodiment, the infrared lens system further comprises means for selectably positioning the negative reflector freely of the positive reflector aperture whereby the objective lens system obtains an unobstructed view of object space thereby providing a wide angle field of view.

In a more particular embodiment the invention infrared lens system comprises an objective lens system having a first lens, a second lens, a third lens, and a dewar window, the first lens having a vertex and a forward and rearward radii r3 and r4, respectively, the second lens having a vertex and a forward and rearward radii r5 and r6, respectively, the third lens having a vertex and a forward and rearward radii r7 and r8, respectively, the dewar window having a vertex and a forward and rearward radii r9 and r10, respectively, the first, second and third lenses and the dewar window vertices being coaxially aligned. The thickness at the vertex of the first lens, the second lens, the third lens and the dewar window being designated by t2, t3, t4 and t5. The distance between the first lens vertex and the second lens vertex being designated by d2, the distance between the second lens vertex and the third lens vertex being designated by d3, the distance the third lens vertex and the dewar window vertex being designated by d4, the distance between the dewar window vertex and the flat image plane being designated by d5, the relationship among the lenses being as set forth in Table I following:

TABLE I

| Lens Element | Radius (inches) | Thickness and Spacing (inches) | Material |
|---|---|---|---|
| 20 | r3 = 2.401 ± 0.220 | t2 = 0.220 ± 0.030 | Si |
|  | r4 = 5.312 ± 1.730 |  |  |
|  |  | d2 = 0.021 ± 0.008 | Air |
| 22 | r5 = 9.169 ± 2.880 | t3 = 0.200 ± 0.050 | Ge |
|  | r6 = 5.057 ± 1.041 |  |  |
|  |  | d3 = 1.660 ± 0.230 | Air |
| 24 | r7 = 0.876 ± 0.111 | t4 = 0.250 ± 0.015 | Si |

TABLE I-continued

| Lens Element | Radius (inches) | Thickness and Spacing (inches) | Material |
|---|---|---|---|
|  | r8 = 0.916 ± 0.213 |  |  |
|  |  | d4 = 0.10 | Air |
| 26 | r9 = ∞ | t5 = 0.04 | Sa |
|  | r10 = ∞ |  |  |
|  |  | d5 = 0.15 | Air | given the equivalent focal length, f, as equal to 1.804 inches and r3, r4, r5, r6, r7, r8, r9, r10 being positive.

A most particular embodiment of the infrared lens system further comprises a selectable afocal telescope being mounted on the lens and adapted to receive light from image space, selectably collimating the light to the first lens, the telescope comprising a positive parabolic reflector having a first reflective surface, an aperture, a negative radius of curvature designated by r11 and a vertex; a negative parabolic reflector having a second reflective surface, a negative radius of curvature designated by r12 and a vertex, the positive parabolic reflector being interposed between the negative parabolic reflector vertex and the first lens vertex, and separated from the negative parabolic reflector vertex by a distance designated by d7, the positive parabolic reflector vertex being separated from the first lens vertex by a distance designated by d6; the vertex of the positive parabolic reflector, negative parabolic reflector, first, second and third lenses being coaxially aligned; the positive parabolic reflector having a first reflective surface, adapted to receive collimated light from image space, reflecting the light to the second reflective surface, the second reflective surface being adapted to receive the light in collimated rays through the positive parabolic reflector aperture to the first lens; whereby, a narrow field of view is obtained, the relationship among the reflectors being as set forth in Table II following:

TABLE II

| Element | Radius (inches) | Stop Diameter (inches) | Clear Aperture (inches) | Distance (inches) | Material |
|---|---|---|---|---|---|
| 34 | r11 = −8.524 ± 0.085 |  | CA1 > 4.951 |  | Reflector |
|  |  |  |  | d7 = 2.931 ± 0.6 | Air |
| 38 | r12 = −2.662 ± 0.027 |  | CA2 > 1.686 |  | Reflector |
| 45 |  | S > 1.276 |  | d6 > 0.0 | Air | given the equivalent focal length, f', as equal to 5.772 inches and r11 and r12 are parabolas with a conic constant of −1.0.

In a most particularly preferred embodiment, the infrared lens system further comprises means for selectably positioning the negative parabolic reflector freely of the positive parabolic reflector aperture whereby the objective lens obtains an unobstructed view of image space, thereby providing a wide angle field of view.

BRIEF DESCRIPTION OF THE DRAWINGS

The invention will be further described as to an illustrative embodiment thereof in conjunction with the attached drawing in which.

DESCRIPTION OF THE PREFERRED EMBODIMENT

Figure 1:
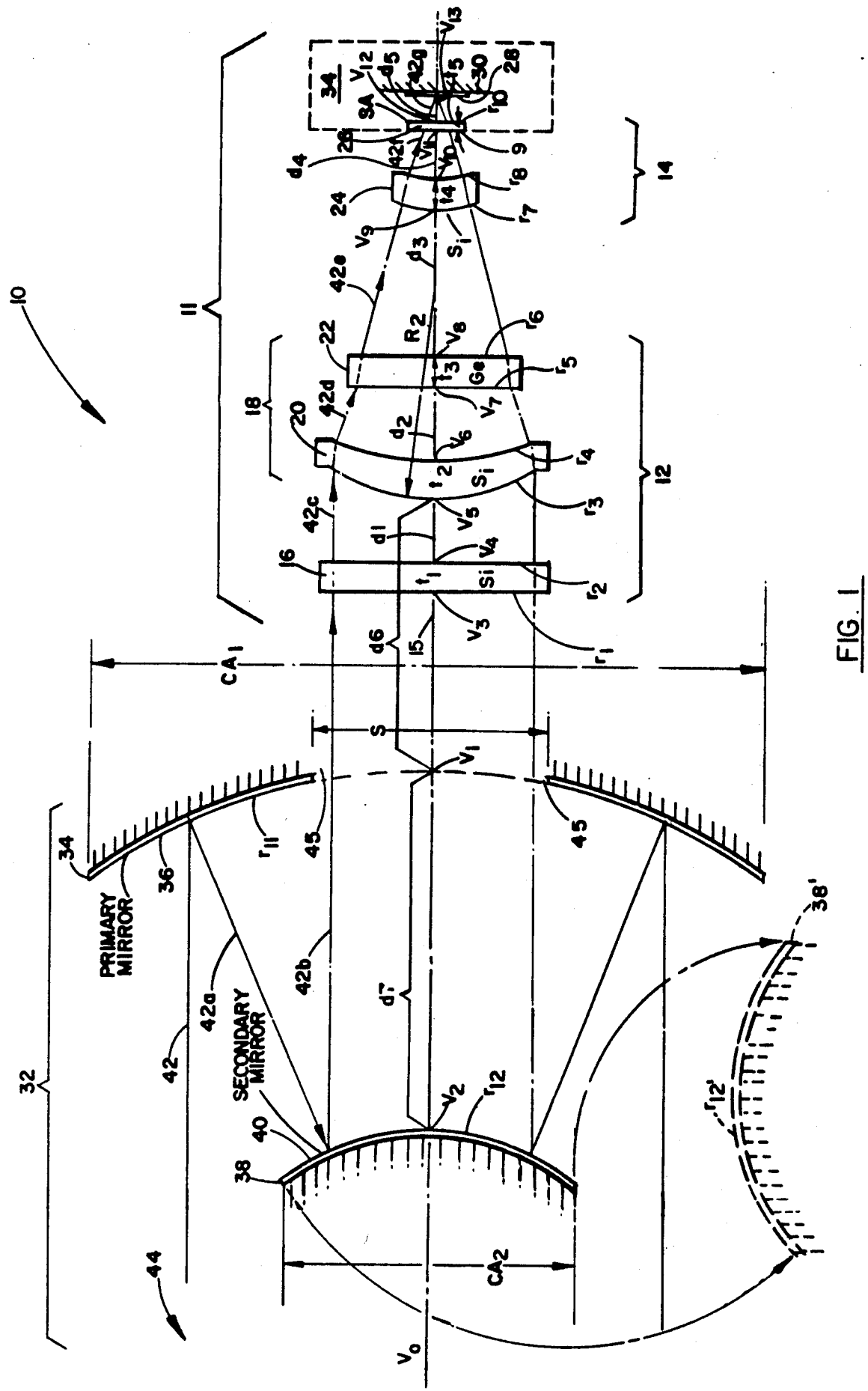
FIG. 1 is a side elevation of the invention three-element infrared lens with selectable afocal telescope.

Now referring to FIG. 1 of the drawing, the infrared lens system 10 is shown having an objective lens system 11 having a plurality of lens elements formed of material optically transparent over the spectral region of 3.3 to 4.2 microns, the plurality of lens elements being coaxially aligned along chief ray 15 and adapted to receive light from object space 44 and to form an image on the flat image plane 28.

A selectable afocal telescope 32 is coupled to the objective lens system 11 in select field of view determining relation with the objective lens system 11, whereby upon selection the selectable afocal telescope 32 cooperates with the objective lens system 11 to provide a narrow field of view.

The selectable afocal telescope further comprises a positive reflector 34 or primary mirror 34, the positive relfector having a first reflector surface 36, an aperture 45, and a negative radius of curvature r11.

A negative reflector 38 or secondary mirror 38, has a second reflective surface 40 and a negative radius of curvature r12. The positive reflector 34 is interposed between the negative reflector 38 and the objective lens system 11, the positive reflector 34 and negative reflector 38 being coaxially aligned along chief ray 15, spaced and coupled to the objective lens system 11; whereby as the afocal telescope 32 is selected, the positive reflector 34 is adapted to receive at first reflector surface 36 collimated light shown as ray 42 from object space 44, reflecting the collimated light shown as ray 42a to the negative reflector 38 second reflective surface 40. The negative reflector 38 second reflective surface 40 reflects the reflected ray 42a as reflected collimated light ray 42b through the aperture 45 to the objective lens system 11, forming an inverted image on the flat image plane 28, the afocal telescope 32 thereby cooperating with the objective lens system 11 to provide a narrow field of view. The definition of the word "inverted" appearing in the *Optical Industry and Systems Purchasing Directory* is incorporated herein by reference.

The invention infrared lens further includes means for selectably positioning the negative reflector 38 freely of the positive reflector aperture 45 whereby the objective lens system 11 obtains an unobstructed view of object space whereby a wide angle field of view is obtained. Reflector 38 is illustrated as phantom refflector 38' positioned free of the positive reflector aperture 35. The means for positioning would include suitable mechanical aparatus for rotating, translating, or pivoting negative reflector 38 free of positive reflector aperture 45, and restoring the negative reflector 38 to its required position of registration in coaxial alignment with positive reflector 34 when selected.

The objective lens system 11 is shown having a forward assembly 12 and a rearward assembly 14, and a first lens 12, a second lens 22, a third lens 24, and a dewar window 26, the first lens 20 having a vertex v5 and a forward and rearward radii r3 and r4, respectively, the second lens having a vertex v7 and a forward and rearward radii r5 and r6, respectively, the third lens having a vertex v9 and a forward and rearward radii r7 and r8, respectively, the dewar window having a vertex v11 and a forward and rearward radii r9 and r10, respectively, the first, second and third lens vertices v5, v7, v9 and the dewar window vertex v11 being coaxially aligned.

The thickness at the vertex of the first lens, the second lens, the third lens and the dewar window being designated by t2, t3, t4 and t5.

The distance between the first lens and the second lens being designated by d2, measured between v6 and v7. The distance between the second lens and the third lens being designated by d3 measured between v8 and v9. The distance between the third lens and the dewar window being designated by d4, measured between v10 and v11. The distance between the dewar window and the flat image plane being designated by d5, measured between v12 and v13. The relationship among the lenses being as set forth in Table I following:

TABLE I

| Lens Element | Radius (inches) | Thickness and Spacing (inches) | Material |
|---|---|---|---|
| 20 | r3 = 2.401 ± 0.220<br>r4 = 5.312 ± 1.730 | t2 = 0.220 ± 0.030 | Si |
|  |  | d2 = 0.021 ± 0.008 | Air |
| 22 | r5 = 9.169 ± 2.880<br>r6 = 5.057 ± 1.041 | t3 = 0.200 ± 0.050 | Ge |
|  |  | d3 = 1.660 ± 0.230 | Air |
| 24 | r7 = 0.876 ± 0.111<br>r8 = 0.916 ± 0.213 | t4 = 0.250 ± 0.015 | Si |
|  |  | d4 = 0.10 | Air |
| 26 | r9 = ∞<br>r10 = ∞ | t5 = 0.04 | Sa |
|  |  | d5 = 0.15 | Air | given the equivalent focal length, f, as equal to 1.804 inches and r3, r4, r5, r6, r7, r8, r9, r10 being positive.

The selectable afocal telescope 32 is mounted on the objective lens system 11 and is adapted to receive light from image space 44, selectably collimating the light 42, 42a, 42b to the first lens 20, the afocal telescope 32 comprising a positive parabolic reflector 34 having a first reflective surface 36, an aperture 45, a negative radius of curvature designated by r11 and a vertex v1; a negative parabolic reflector 38 having a second reflective surface 40, a negative radius of curvature designated by r12 and a vertex v2, the positive parabolic reflector 34 being interposed between the negative parabolic reflector vertex v2 and the first lens vertex v5, and separated from the negative parabolic reflector vertex v2 by a distance designated as d7, the positive parabolic reflector vertex v1 being separated from the first lens vertex by a distance designated by d6. The vertex of the positive parabolic reflector 34, negative parabolic reflector 38, first, second and third lenses 20, 22, 24 being coaxially aligned; the positive parabolic reflector 34 having a first reflective surface 36, adapted to receive collimated light 42 from image space 44, reflecting the light 42a to the second reflective surface 40, the second reflective surface 40 being adapted to reflect the light 42b in collimated rays through the positive parabolic reflector aperture 45 to the first lens 20, whereby, a narrow field of view is obtained the relationship among the reflectors being as set forth in Table II following:

TABLE II

| Element | Radius (inches) | Stop Diameter (inches) | Clear Aperture (inches) | Distance (inches) | Material |
|---|---|---|---|---|---|
| 34 | r11 = −8.524 ± 0.085 |  | CA1 > 4.951 |  | Reflector |
|  |  |  |  | d7 = 2.931 ± 0.6 | Air |
| 38 | r12 = −2.662 ± 0.027 |  | CA2 > 1.686 |  | Reflector |
| 45 |  | S > 1.276 |  | d6 > 0.0 | Air | given the equivalent focal length, f', as equal to 5.772 inches and r11 and r12 are parabolas with a conic constant of −1.0.

The invention envisions means for selectably positioning the negative parabolic reflector 38 freely of the positive parabolic reflector aperture 45 whereby the objective lens 11 obtains an unobstructed view of image space 44 thereby providing a wide angle field of view the means for positioning the negative reflector 38 freely of aperture 45 as shown by phantom reflector 38′ having radius of curvature r12′ is meant to include all systems capable of mechanically translating the reflector vertically or laterally in a plane normal to the optical axis 15 of the objective lens 11. In the alternative, the selectable afocal telescope 32 is selectably removed or installed on the objective lens 11 to obtain the desired field of view.

As defined in the "Handbook of Military Infrared Technology" by William L. Wolfe, the University of Michigan, 1965, pg. 422, "An afocal system has its object and image at infinity and thus has no focal length. It is composed of two or more components so arranged that (in a two-component system) the image of the first component, which is the object for the second, lies exactly at the first focal point of the second component and is thus reimaged at infinity." The reflecting afocal telescope 32 provides magnification and is designed to avoid reverting or inverting the image viewed by first lens 20 through aperture 45. The image projected onto the flat detector surface 28 retains its orientation with respect to image space with a wide or narrow angle field of view selected. The design of the afocal telescope 32 coupled to objective lens 11 for projecting an image onto flat detector 28 mounted on cryogenically cooled body 30 in a dewar 34 having a dewar window 26 specifically to avoid reverting and inverting the image when the telescope is used for narrow angle viewing eliminates the added complexity of aparatus, such as additional lens elements, or such as additional electronic processing of image data derived from signals provided by detector 28 in response to the image projected on detector 28.

The objective lens 11 is fabricated having a forward assembly 12 and a rearward assembly 14, the forward assembly 12 having window 16 having vertex v3 and radius of curvature r1 and r2, and lens doublet 18 comprised of first lens 20 of silicon and second lens 22 of germanium. Third lens 24 is made of silicon.

The design parameters for the infrared lens system appearing in Tables I and II follow from initial infrared lens specifications and successful ray tracing approximations, which when applied provide optimum ranges outside of which the lens system would become unacceptable in view of the stated specifications.

The specifications require that the selectable field of view catadioptric infrared lens system invention provide a narrow field of view measuring 1.25 degrees from side to side with a magnification power of 3.2 and a wide field of view measuring 4 degrees from top to bottom and 8 degrees from side to side.

The design permits selection of the wide field of view by removing reflector 38 to phantom reflector 38 position exposing aperture 45, or in the alternative removing afocal telescope 32 from the infrared objective lens system 11. The narrow field of view is obtained by posiitoning selectable afocal telescope 32 in front of the infrared lens 11. The distance d6 between the vertex v1 of positive reflector 34 and vertex v5 of first lens 20 must be greater than the thickness of first window 16 and would typically be less than one inch.

Positive reflector 34 and negative reflector 38 are shown having diameters CA1 and CA2, respectively. VO is shown locating the common focal point of first reflective surface 36 and second reflective surface 40, respectively. Radius R2 describes an arc representing the positive radius of curvature of first lens 20 having radius of curvature r3. All objective lens 11 surfaces are spherical. The diameter of the aperture 45 also referred to as stop S, is slightly smaller in diameter than first lens 20.

There is thus provided an infrared objective lens system, having axially aligned optical elements of silicon and germanium. In the preferred embodiment of the invention objective lens 11 system defined by Table I, the equivalent focal length f' is 1.804 inches. Selecting the selectable afocal telescope 32 increases the equivalent focal length f' to 5.772 inches. The wavelength region for the design of the preferred embodiment invention lens is 3.3 to 4.2 microns.

The description provided is intended to be illustrative only and is not intended to be limitive. Those skilled in the art may conceive of modifications to the Figure disclosed. However, any such modifications which fall within tthe purview of the description are intended to be included therein as well. The scope of this invention shall be determined from the scope of the following claims including their equivalents.

What is claimed is:

1. An infrared lens system for projecting an image from object space onto a flat image plane, said lens system being corrected over the spectral region of 3.3 to 4.2 microns and having a selectable narrow field of view comprising:
   an objective lens system having a plurality of lens elements formed of material optically transparent over the spectral region of 3.3 to 4.2 microns, said plurality of lens elements being coaxially aligned and adapted to receive light from object space and to form an inverted sharply focused image on said flat image plane,
   a selectable afocal telescope, said selectable afocal telescope being in select field of view determining relation with said objective lens system, whereby upon selection, said selectable afocal telescope cooperates with said objective lens system to provide an inverted sharply focused image on said flat image plane, said infrared lens system thereby having a narrow field of view;
   said objective lens being adapted to form an inverted sharply focused image on said flat image plane upon non-selection of said selectable afocal telescope, said infrared lens system thereby having a wide field of view.

2. The infrared lens system of claim 1, wherein said selectable afocal telescope further comprises:
   a positive reflector, said positive reflector having a first reflector surface, an aperture, and a negative radius of curvature; and
   a negative reflector, said negative reflector having a second reflective surface and a negative radius of curvature, said positive reflector being interposed between said negative reflector and said objective lens system, said positive reflector and negative reflector being coaxially aligned, spaced and coupled to said objective lens system; whereby, as said afocal telescope is selected, said positive reflector is adapted to receive collimated light from object space and to reflect said collimated light to said negative reflector, said negative reflector reflecting said reflected collimated light in collimated rays through said aperture to said objective lens system so as to form an inverted image on said flat image plane, said afocal telescope thereby coperating with said objective lens system to provide a narrow field of view.

3. The infrared lens system of claim 1, further comprising:
   means for selectably positioning said negative reflector so as to be free of said positive reflector aperture whereby said objective lens system obtains an unobstructed view of object space whereby a wide angle field of view is obtained.

4. An infrared lens system for projecting an image from object space onto a flat image plane, said lens system being corrected over the spectral region of 3.3 to 4.2 microns and having a selectable narrow field of view comprising:
   an objective lens system having a first lens;
   a second lens;
   a third lens; and a
   dewar window, said first lens having a vertex and a forward and rearward radii r3 and r4, respectively, said second lens having a vertex and a forward and rearward radii r5 and r6, respectively, said third lens having a vertex and a forward and rearward radii r7 and r8, respectively, said dewar window having a vertex and a forward and rearward radii r9 and r10, respectively, said first, second and third lens and said dewar window vertices being coaxially aligned;
   the thickness at the vertex of said first lens, said second lens, said third lens and said dewar window being designated by t2, t3, t4 and t5;
   the distance between said first lens and secnd lens being designated by d2, the distance between said second lens and said third lens being designated by d3, the distance between said third lens and said dewar window being designated by d4, the distance between said dewar window and said flat image plane being designated by d5, the relationship among said lenses being as set forth in Table I following:

TABLE I

| Lens Element | Radius (inches) | Thickness and Spacing (inches) | Material |
|---|---|---|---|
| 20 | r3 = 2.401 ± 0.220<br>r4 = 5.312 ± 1.730 | t2 = 0.220 ± 0.030 | Si |

TABLE I-continued

| Lens Element | Radius (inches) | Thickness and Spacing (inches) | Material |
|---|---|---|---|
| 22 | r5 = 9.169 ± 2.880<br>r6 = 5.057 ± 1.041 | d2 = 0.021 ± 0.008<br>t3 = 0.200 ± 0.050 | Air<br>Ge |
| 24 | r7 = 0.876 ± 0.111<br>r8 = 0.916 ± 0.213 | d3 = 1.660 ± 0.230<br>t4 = 0.250 ± 0.015 | Air<br>Si |
| 26 | r9 = ∞<br>r10 = ∞ | d4 = 0.10<br>t5 = 0.04 | Air<br>Sa |
|  |  | d5 = 0.15 | Air | given the equivalent focal length, f, as equal to 1.804 inches and r3, r4, r5, r6, r7, r8, r9, r10 being positive.

5. The infrared lens system of claim 4, further comprising: a selectable afocal telescope mounted on said objective lens system and adapted to receive light from image space and to selectably collimate said light to said first lens, said afocal telescope comprising: a positive parabolic reflector having a first reflective surface, an aperture, a negative radius of curvature designated by r11 and a vertex; a negative parabolic reflector having a second reflective surface, a negative radius of curvature designated by r12 and a vertex; said positive parabolic reflector interposed between said negative parabolic reflector vertex and said first lens vertex, and separated from said negative parabolic reflector vertex by a distance designated by d7, said positive parabolic reflector vertex separated from said first lens vertex by a distance designated by d6; the vertex of said positive parabolic reflector, negative parbolic reflector, first, second and third lenses coaxially aligned; said positive parabolic reflector having a first reflective surface, adapted to receive collimated light from image space and to reflect said light to said second reflective surface, said second reflective surface adapted to reflect said light in collimated rays through said positive parabolic reflector aperture to said first lens whereby a narrow field of view is obtained, the relationship among said reflectors being as set forth in Table II following:

TABLE II

| Element | Radius (inches) | Stop Diameter (inches) | Clear Aperture (inches) | Distance (inches) | Material |
|---|---|---|---|---|---|
| 34 | r11 = −8.524 ± 0.085 |  | CA1 > 4.951 |  | Reflector |
| 38 | r12 = −2.662 ± 0.027 |  | CA2 > 1.686 | d7 = 2.931 ± 0.6 | Air |
| 45 |  | S > 1.276 |  | d6 > 0.0 | Reflector<br>Air | given the equivalent focal length, f', as equal to 5.772 inches and r11 and r12 are parabolas with a conic constant of −1.0.

6. The infrared lens system of claim 5, further comprising: means for selectably positioning said negative parabolic reflector so as to be free of said positive parabolic reflector aperture whereby said objective lens obtains an unobstructed view of image space, thereby providing a wide angle field of view.

* * * * *